(12) United States Patent
Sivinski

(10) Patent No.: US 11,723,299 B2
(45) Date of Patent: *Aug. 15, 2023

(54) QUICK CHANGE CLOSING WHEEL ASSEMBLY WITH CENTERING ADJUSTMENT

(71) Applicant: Harvest International, Inc., Storm Lake, IA (US)

(72) Inventor: Jeffrey Alan Sivinski, Cherokee, IA (US)

(73) Assignee: Harvest International, Inc., Storm Lake, IA (US)

( * ) Notice: Subject to any disclaimer, the term of this patent is extended or adjusted under 35 U.S.C. 154(b) by 262 days.

This patent is subject to a terminal disclaimer.

(21) Appl. No.: 16/683,407

(22) Filed: Nov. 14, 2019

(65) Prior Publication Data
US 2020/0077569 A1 Mar. 12, 2020

Related U.S. Application Data

(63) Continuation of application No. 15/451,736, filed on Mar. 7, 2017, now Pat. No. 10,512,207.
(Continued)

(51) Int. Cl.
*A01C 5/06* (2006.01)
*A01C 7/20* (2006.01)
*A01B 49/02* (2006.01)

(52) U.S. Cl.
CPC ............ *A01C 5/068* (2013.01); *A01B 49/027* (2013.01); *A01C 5/066* (2013.01); *A01C 7/201* (2013.01)

(58) Field of Classification Search
CPC ......... A01C 5/068; A01C 5/066; A01C 7/201; A01C 7/203; A01B 49/027
See application file for complete search history.

(56) References Cited

U.S. PATENT DOCUMENTS 2,829,578 A * 4/1958 Brown .................... A01C 7/203
172/170
3,090,333 A * 5/1963 Caha ........................ E02F 5/145
111/63
(Continued)

FOREIGN PATENT DOCUMENTS

WO WO-2016048167 A1 * 3/2016 ........... A01B 61/046

OTHER PUBLICATIONS

European Patent Office, "The International Search Report and the Written Opinion of the International Searching Authority, or the Declaration" issued in connection to International Application No. PCT/US20177/021111, 21 pages, dated Aug. 22, 2017.

*Primary Examiner* — Thomas B Will
*Assistant Examiner* — Joel F. Mitchell
(74) *Attorney, Agent, or Firm* — McKee, Voorhees & Sease, PLC

(57) ABSTRACT

A closing wheel assembly for a seed row planter unit resides behind the gauge wheel assembly and furrow disks of the planter unit. The closing wheel assembly includes a coupler with a pair of closing wheels mounted thereon. A single pin removably extends through the coupler and through the gauge wheel assembly to detachably mount the closing wheel assembly to the gauge wheel assembly. Different closing wheel assemblies can be quickly mounted on the row unit, depending upon the type of seed being planted. The closing wheels are laterally adjustable via a rotatable threaded bushing so as to be centered behind the furrow disks.

18 Claims, 9 Drawing Sheets

Related U.S. Application Data

(60) Provisional application No. 62/304,984, filed on Mar. 8, 2016.

(56) References Cited

U.S. PATENT DOCUMENTS

| | | | |
|---|---|---|---|
| 4,116,140 A | 9/1978 | Anderson et al. | |
| 4,307,674 A | 12/1981 | Jennings et al. | |
| 4,404,918 A | 9/1983 | Whalen et al. | |
| 4,570,554 A | 2/1986 | Clark | |
| 4,579,071 A | 4/1986 | Johnson | |
| 4,596,200 A | 6/1986 | Gafford et al. | |
| 4,714,033 A | 12/1987 | Neumeyer | |
| 4,920,901 A | 5/1990 | Pounds | |
| 5,375,542 A | 12/1994 | Schaffert | |
| 5,427,038 A | 6/1995 | Ege | |
| 5,562,055 A | 10/1996 | Petersen | |
| 5,619,939 A * | 4/1997 | Herman et al. | A01C 5/064 111/163 |
| 5,676,073 A | 10/1997 | Bergland et al. | |
| 5,697,455 A | 12/1997 | Deckler | |
| 5,826,337 A | 10/1998 | Klinkner et al. | |
| 5,896,820 A | 4/1999 | Klinkner et al. | |
| 6,041,584 A | 3/2000 | Honl | |
| 6,237,696 B1 | 5/2001 | Mayerle | |
| 6,386,127 B1 * | 5/2002 | Prairie et al. | A01B 71/02 111/167 |
| 6,578,502 B1 * | 6/2003 | Barnstable et al. | A01B 35/16 111/164 |
| 6,918,343 B2 | 7/2005 | Kester | |
| 7,631,607 B2 | 12/2009 | Vandersnick | |
| 7,669,536 B2 | 3/2010 | Martin | |
| 7,975,629 B1 | 7/2011 | Martin | |
| 8,267,021 B2 | 9/2012 | Mariman et al. | |
| 8,333,161 B2 | 12/2012 | Arnett et al. | |
| 8,393,407 B2 | 3/2013 | Freed | |
| 8,789,481 B2 | 7/2014 | Castagno Manasseri et al. | |
| 8,863,857 B2 | 10/2014 | Bassett | |
| 8,910,582 B2 * | 12/2014 | Mariman et al. | A01C 5/066 111/192 |
| 8,939,095 B2 | 1/2015 | Freed | |
| 9,148,989 B2 | 10/2015 | Van Buskirk et al. | |
| 9,204,590 B2 * | 12/2015 | Schaffert et al. | A01C 5/04 |
| 9,456,542 B2 * | 10/2016 | Schaffert | A01B 15/16 |
| 9,686,900 B2 * | 6/2017 | Raetzman et al. | A01B 61/046 |
| 2005/0072344 A1 | 4/2005 | Kester | |
| 2011/0155031 A1 | 6/2011 | Arnett et al. | |
| 2013/0160684 A1 | 6/2013 | Whalen et al. | |
| 2013/0333599 A1 | 12/2013 | Bassett et al. | |
| 2014/0033958 A1 | 2/2014 | Bassett | |
| 2014/0090585 A1 * | 4/2014 | Sauder et al. | A01B 49/027 111/164 |
| 2015/0000940 A1 | 1/2015 | Patwardhan et al. | |
| 2015/0271986 A1 | 10/2015 | Sauder et al. | |
| 2015/0359162 A1 | 12/2015 | Needham et al. | |
| 2016/0050837 A1 | 2/2016 | Schatfert et al. | |
| 2016/0374258 A1 * | 12/2016 | Schaffert | A01C 5/066 172/773 |
| 2017/0000014 A1 * | 1/2017 | Anderson et al. | A01C 5/068 |
| 2022/0000016 A1 * | 1/2022 | Radtke et al. | A01C 23/025 |

* cited by examiner

QUICK CHANGE CLOSING WHEEL ASSEMBLY WITH CENTERING ADJUSTMENT

CROSS-REFERENCE TO RELATED APPLICATIONS

This application is a Continuation Application of U.S. Ser. No. 15/451,736 filed Mar. 7, 2017, which claims priority to previously filed provisional application, U.S. Ser. No. 62/304,984, filed Mar. 8, 2016, all of which are herein incorporated by reference in their entirety.

BACKGROUND OF THE INVENTION

Row planters with a plurality of row units are commonly used in farming to plant seeds for various crops. The row planter includes a tool bar attached to a tractor, with seed hoppers and row units mounted to the tool bar. Each row unit includes a pair of disks for forming a furrow, a pair of gauge wheels, and a pair closing wheels to close the furrow after seed has been planted. Depending upon the type of seed being planted, such as corn or soybeans, different types of closing wheels are sometimes used. However, since the closing wheels are conventionally mounted using nut and bolt fasteners, changing the closing wheels is a slow, time consuming process. Thus, there is a need for quick change closing wheel assembly for use on row planters.

The bolted coupling of the closing wheel assembly to the row planter also makes it difficult to precisely center the closing wheels, which is important for best crop yield. If the closing wheels are off-center, the soil may not sufficiently cover the planted seeds, thereby reducing crop yield. Therefore, there is a need for a closing wheel assembly which can be quickly and easily adjusted to maintain a proper centered position relative to the furrows.

Accordingly, a primary objective of the present invention is the provision of a closing wheel assembly for a row planter which can be quickly and easily attached and detached to the guide wheel assembly of the row planter.

Another objective of the present invention is a provision of interchangeable closing wheels assemblies which can be quickly and easily exchanged for one another on a row planter.

A further objective of the present invention is a provision of a closing wheel assembly for a row planter which can be quickly and easily adjusted to center the closing wheels for proper alignment on the row planter unit.

Still another objective of the present invention is the provision of a seed row planter wherein the closing wheel assembly which mounts to the guide wheel assembly using a single pin.

Yet another objective of the present invention is the provision of a closing wheel assembly for a row planter unit which can be removed and replaced with a different closing wheel assembly, depending upon the type of seed being planted.

Another objective of the present invention is the provision of closing wheel assembly for a row planter which can be centered by loosening a nut and turning a threaded bushing.

Still another objective of the present invention is the provision of a closing wheel assembly having adjustable arms for centering the closing wheels.

A further objective of the present invention is the provision of a closing wheel assembly for a seed row planter which is economical to manufacture and durable in use.

These and other objectives will become apparent from the following description of the invention.

SUMMARY OF THE INVENTION

A closing wheel assembly is provided for a seed row planter unit which is quickly and easily interchangeable with a second closing wheel assembly depending on the type of seed being planted. Each closing wheel assembly it is detachably mounted to the guide wheel assembly by a single pin extending through aligned holes in the closing wheel assembly and the guide wheel assembly.

The closing wheels of the closing wheel assembly can be laterally adjusted so as to center the wheels for accurate planting. The centering mechanism includes a pair of bolts extending through arms on opposite sides of the closing wheel assembly and which define a pivot axis for the arms. One of the bolts extends through a threaded bushing which can be turned by a wrench to adjust the lateral positions of the arms, and then locked in place by a jam nut.

DESCRIPTION OF THE DRAWINGS

Figure 1:
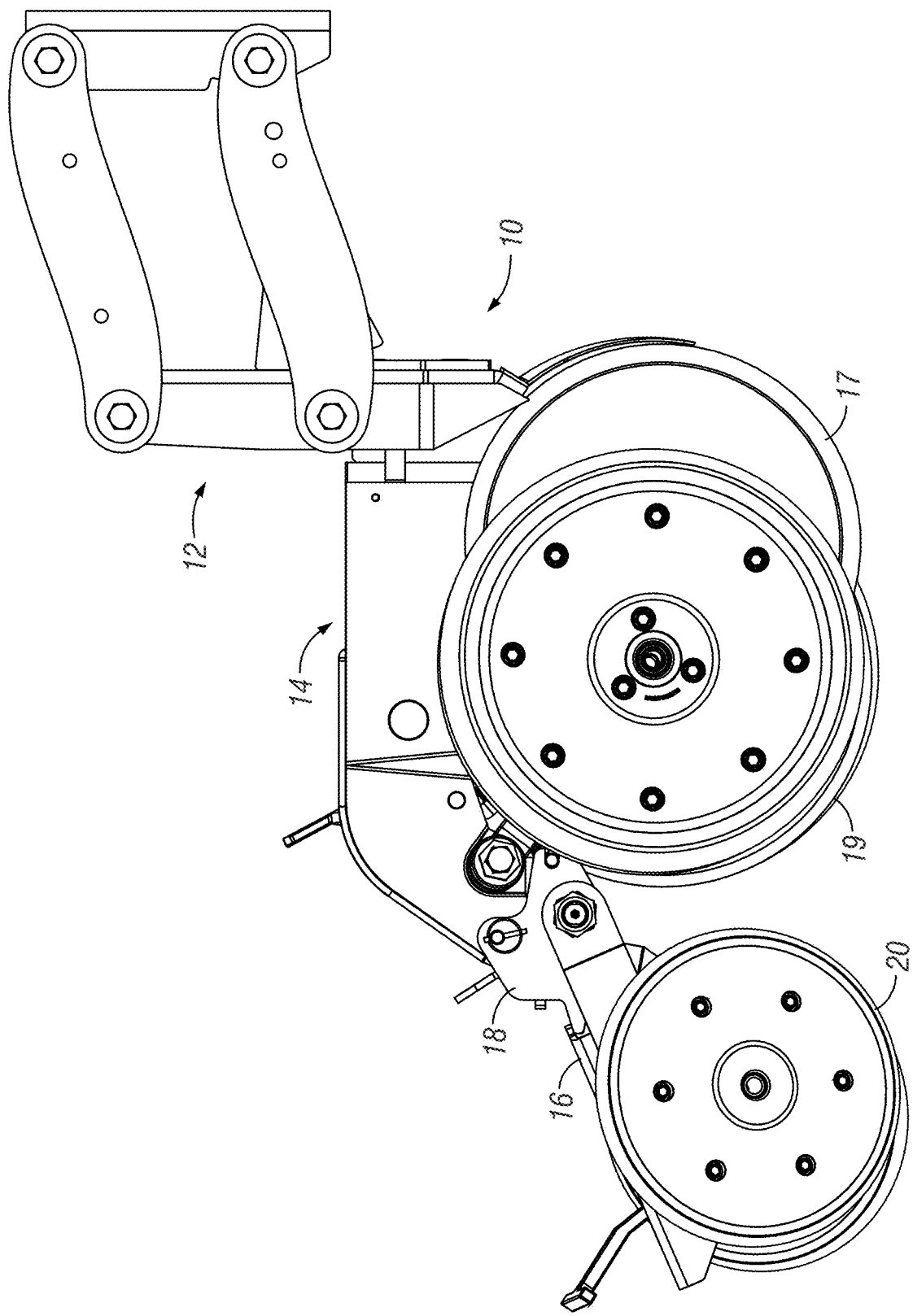
FIG. 1 is a side elevation view of the guide wheel assembly and the closing wheel assembly of a row planter unit in accordance with present invention.
Figure 2:
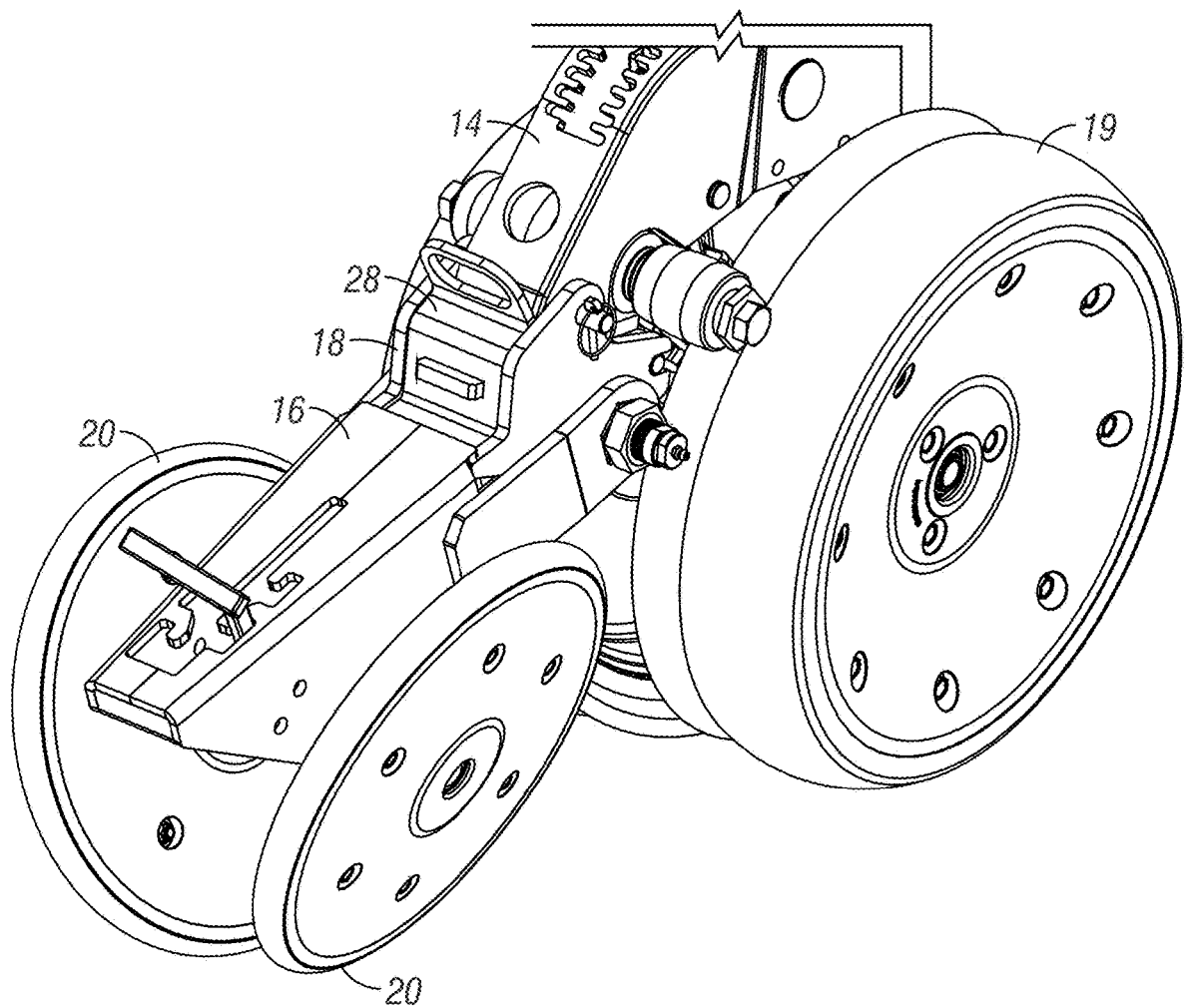
FIG. 2 is a perspective view of the guide wheel and the closing wheel assemblies shown in FIG. 1.
Figure 3:
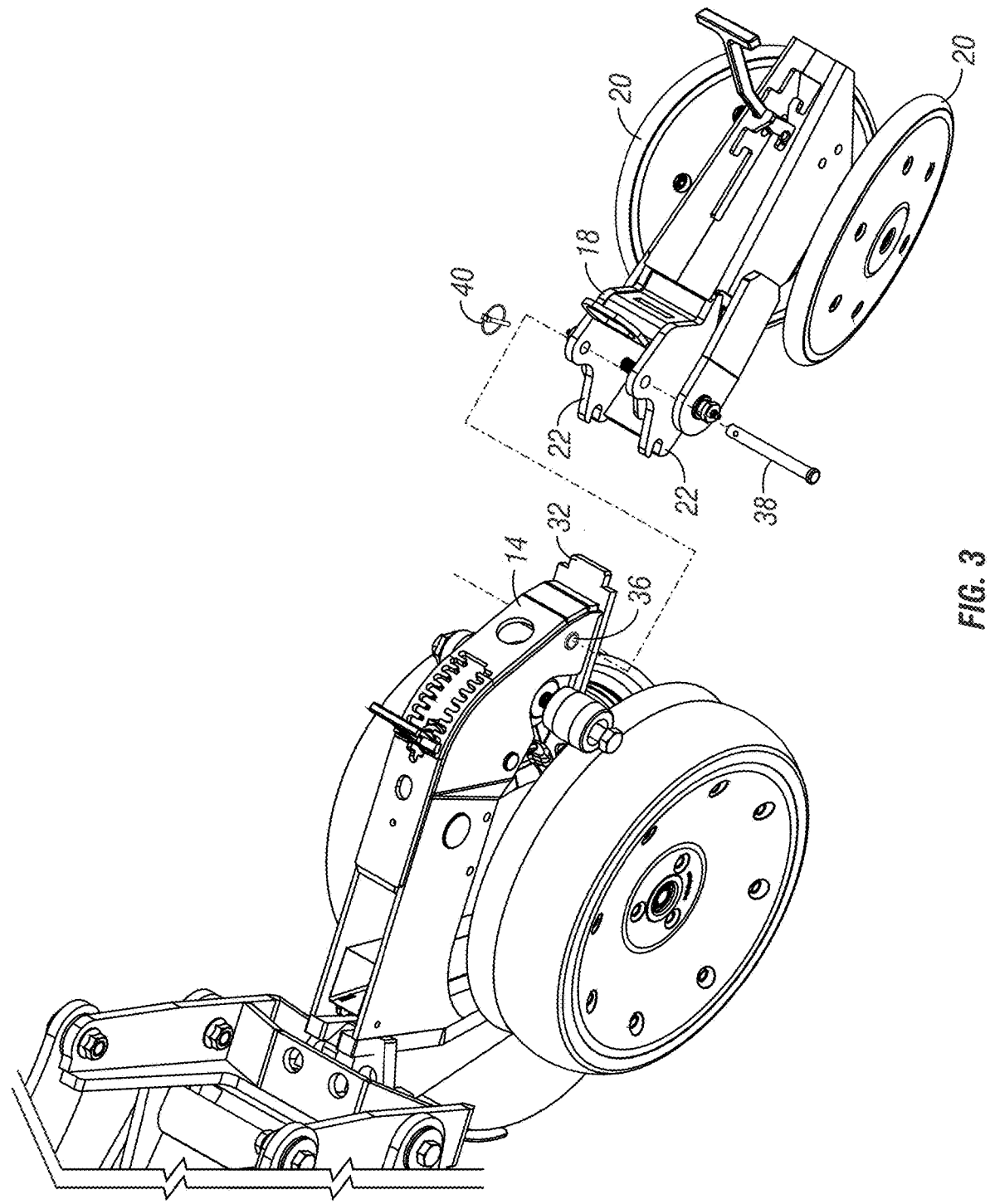
FIG. 3 is an exploded view of the guide wheel assembly and the closing wheel assembly with the quick coupler pin, according to the present invention.
Figure 4:
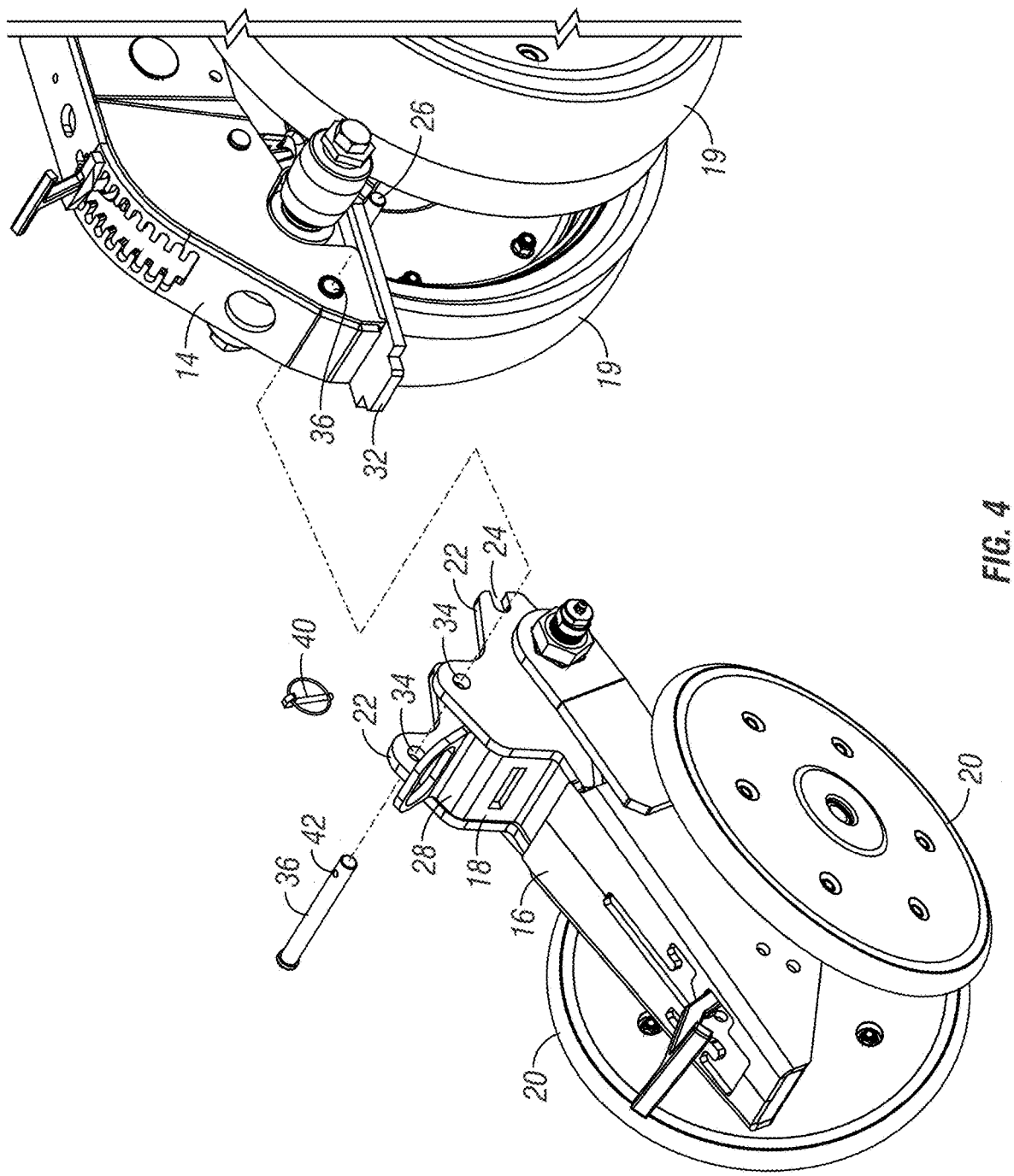
FIG. 4 is another exploded perspective view of the guide wheel assembly, the closing wheel assembly, and the quick coupling pin.
Figure 5:
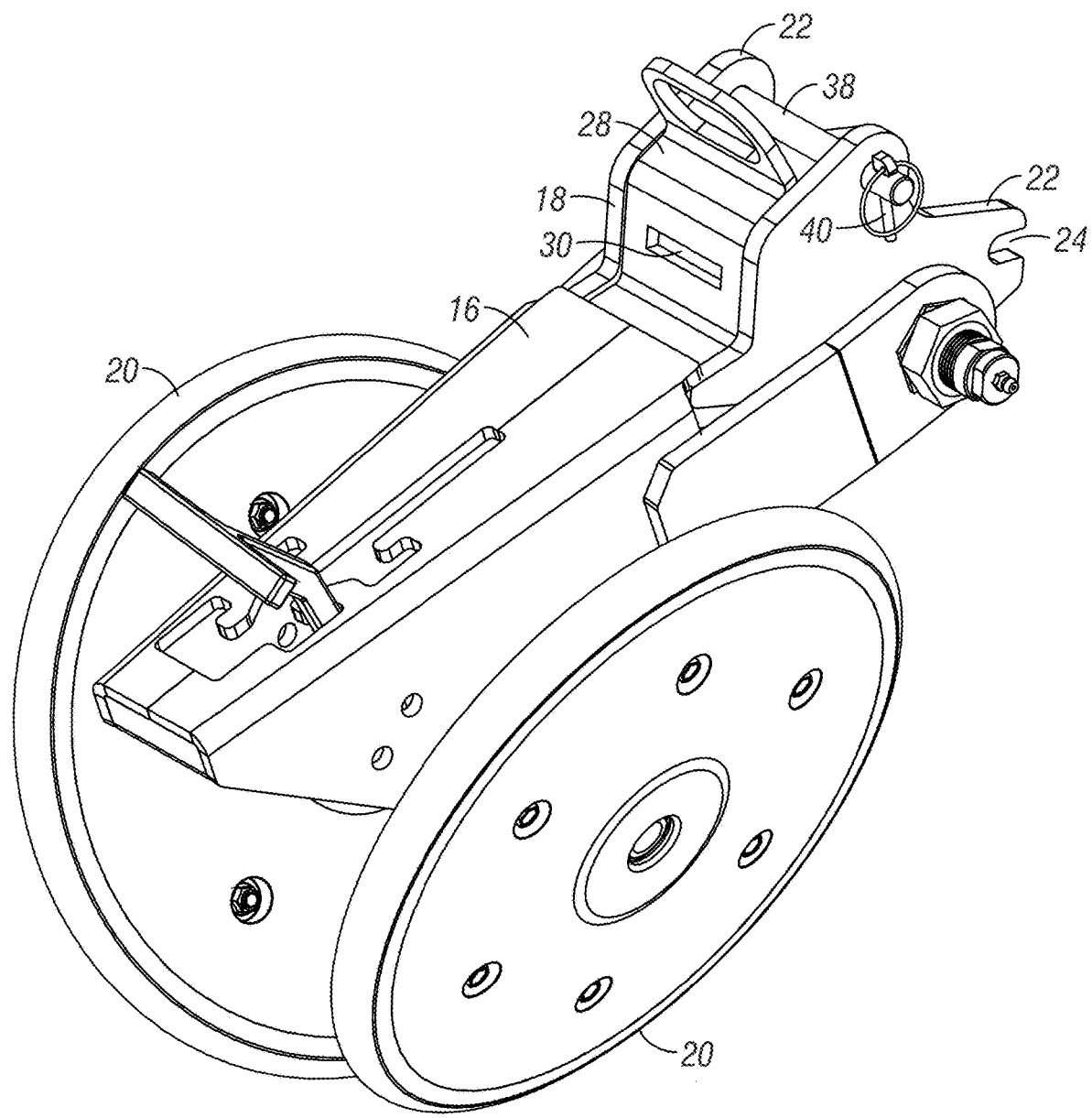
FIG. 5 is a perspective view of the closing wheel assembly having the centering adjustment mechanism according to the present invention.
Figure 6:
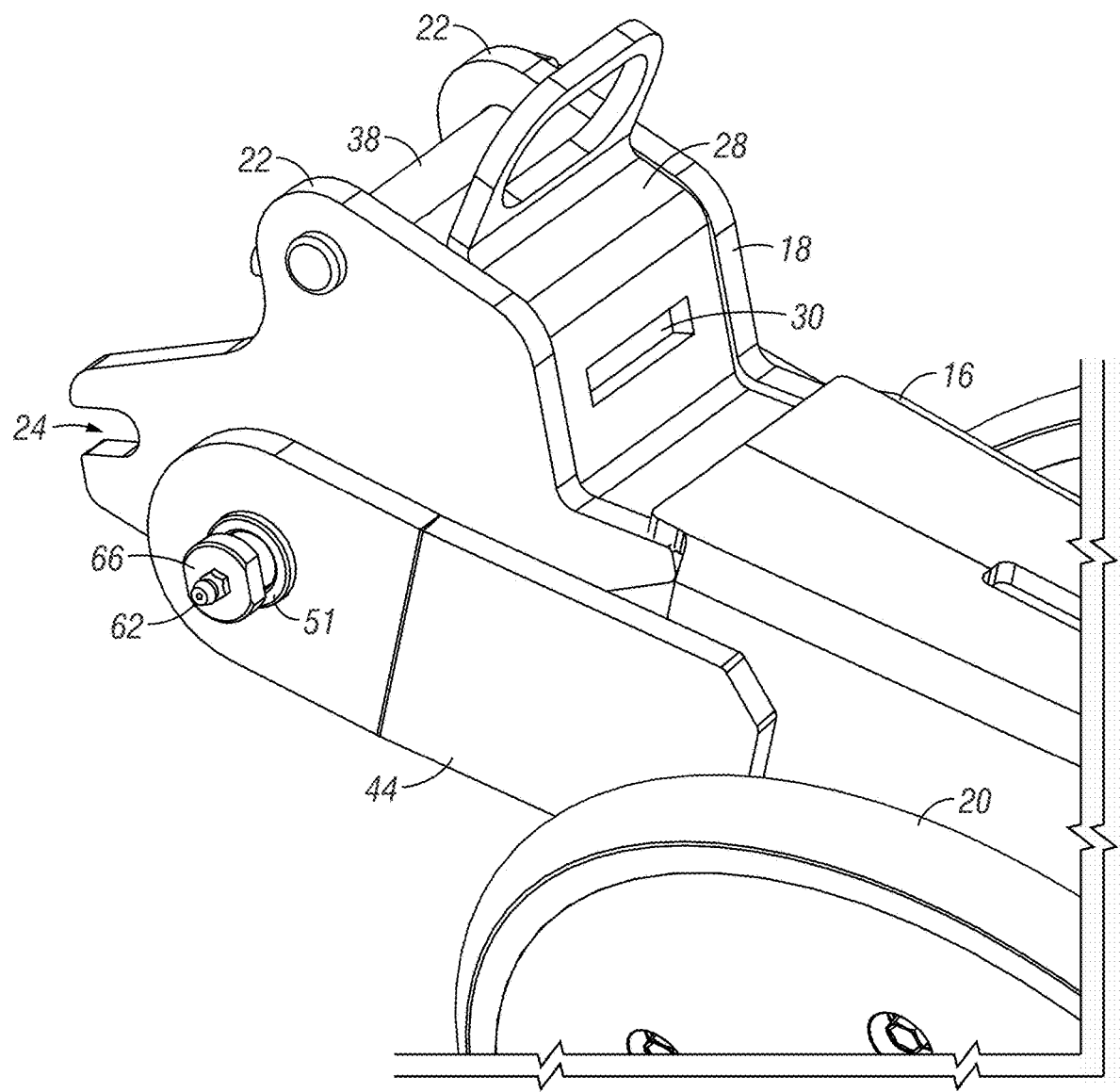
FIG. 6 is a perspective view from the front end of the closing wheel assembly having the centering adjustment mechanism according to the present invention.
Figure 7:
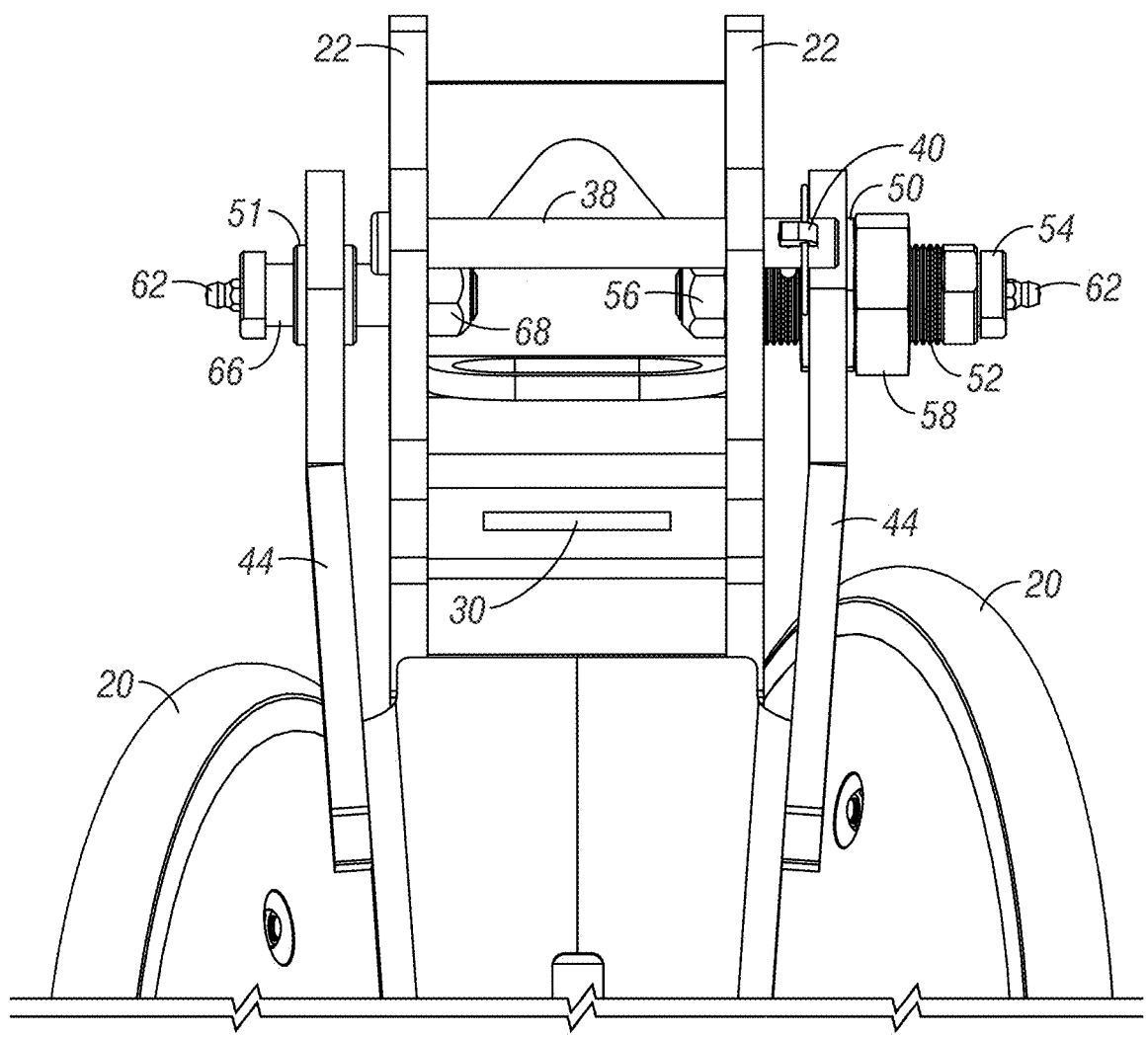
FIG. 7 is a top plan view of the closing wheel assembly and showing the quick coupler pin and self-centering mechanism, according to the present invention.
Figure 8:
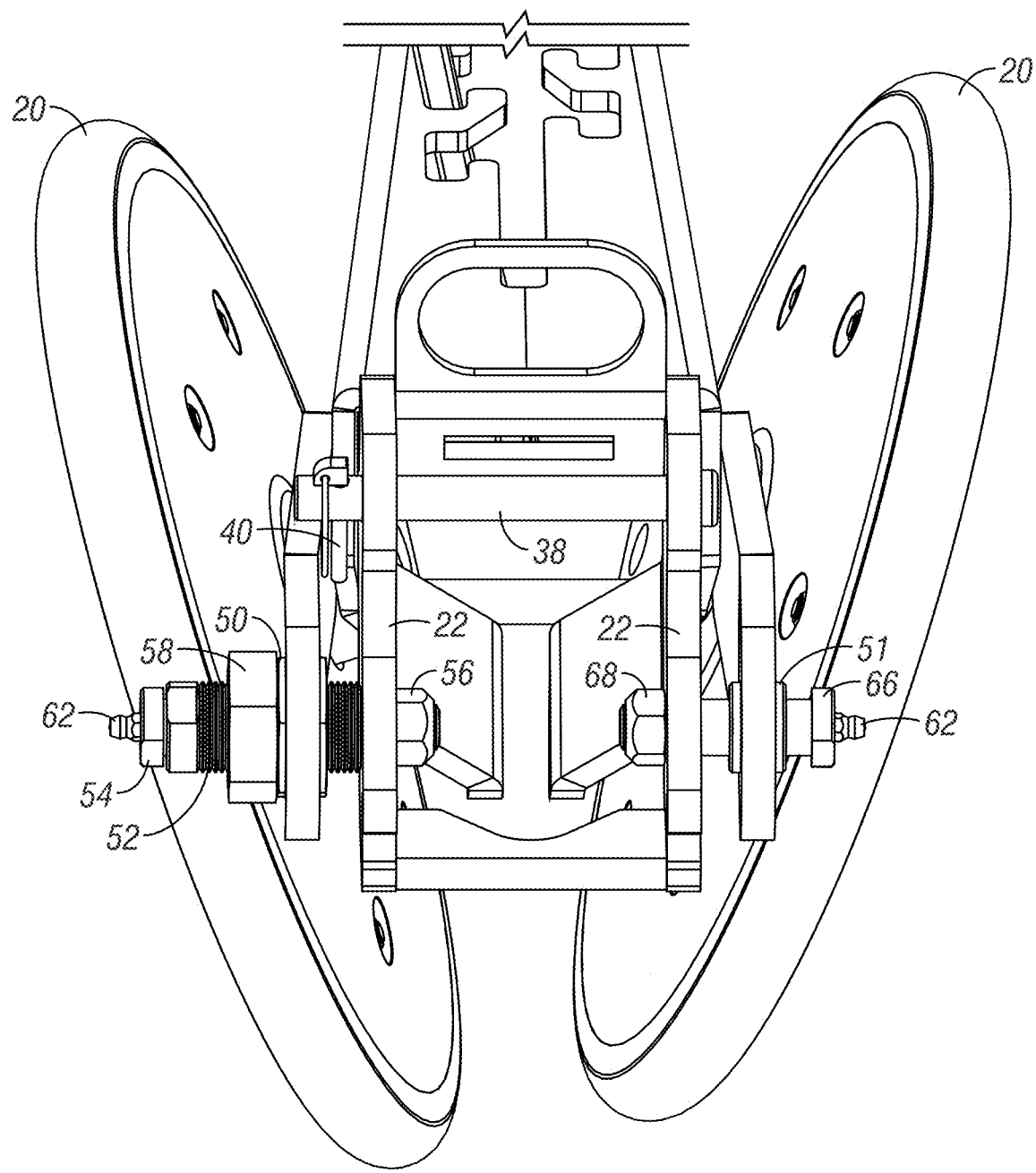
FIG. 8 is a front elevation view of the closing wheel assembly with the quick coupler pin and the centering adjustment mechanism.
Figure 9:
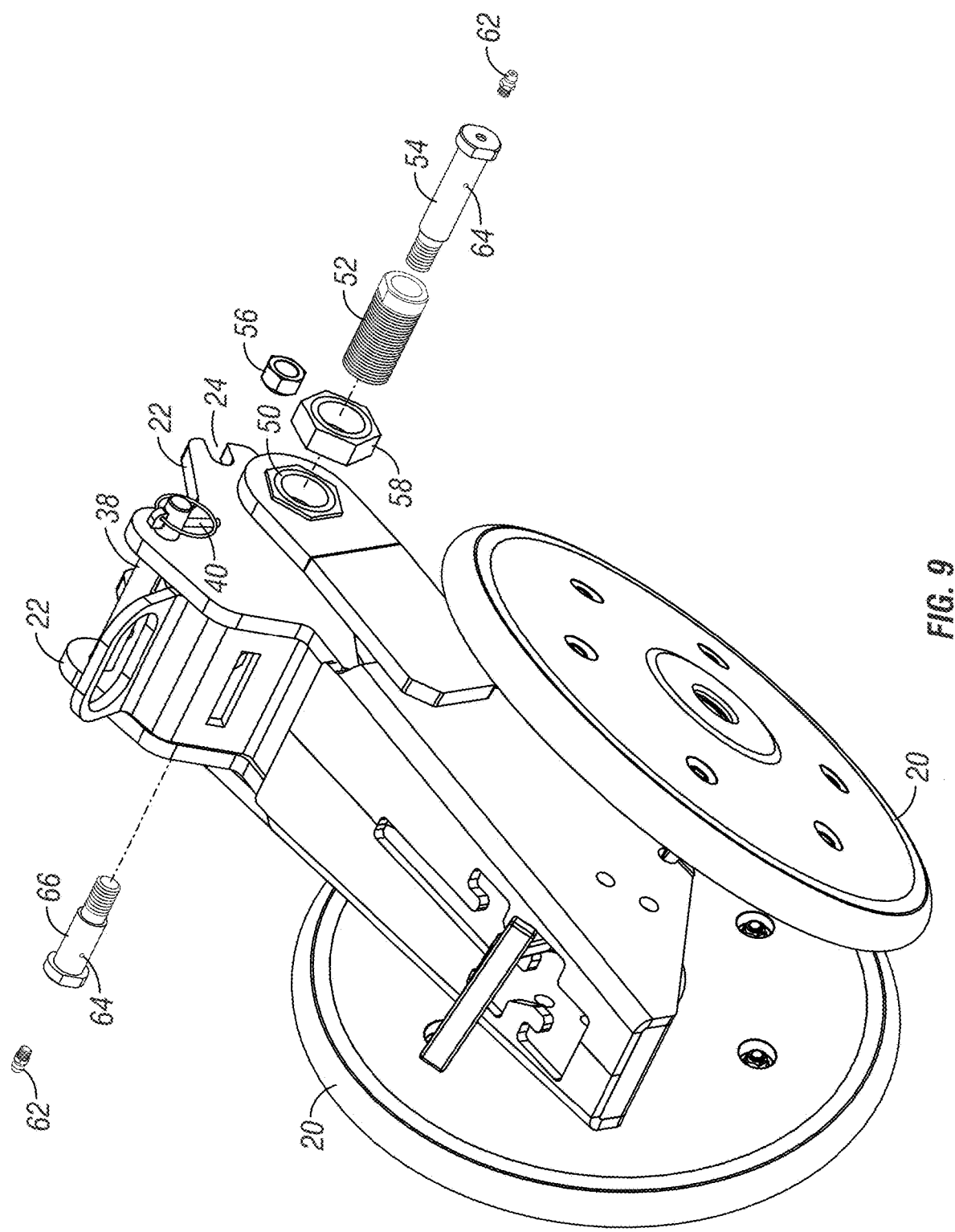
FIG. 9 is an exploded perspective view showing the centering adjustment mechanism, according to the present invention.

A row unit 10 for an agricultural row planter is shown in FIG. 1. The row unit 10 includes a mounting bracket 12 to attach the row unit 10 to a tool bar (not shown) hitched to a tractor, a first frame 14 mounted on the bracket 12, and second frame 16 detachably connected the first frame 12 by a coupler 18. The first frame supports a pair of disks 17 which form a furrow, and a pair of gauge wheels 19. The second frame 16 supports a pair of closing wheels 20.

The present invention is directed towards improvements to the closing wheel assembly 16, 18, 20 which allows one set of closing wheels to be quickly and easily interchanged with a second set of closing wheels, and which allows for simple lateral adjustment to center the closing wheels behind the disks 17.

More particularly, the coupler 18 allows a farmer to interchange different closing wheel assemblies depending on what seed is being planted. The coupler 18 includes side plates 22, each of which have a notch 24 at the forward end. Each notch 24 is adapted to receive a stud post 26 extending laterally outwardly on opposite sides of the gauge wheel frame 14.

The coupler 18 also includes a central web 28 extending between the plates 22 with a slot 30 formed in the web 28. The slot 30 is adapted to receive a tab 32 extending rearwardly from the gauge wheel frame 14.

Each of the side plates 22 of the coupler 18 have a hole 34 which aligns with a hole 36 extending through the gauge wheel frame 14. A retaining pin 38 is removably inserted through the holes 34, 36 to connect the coupler 18 to the frame 14. A lynch pin or cotter pin 40 extends through a hole 42 in the retaining pin 38 to prevent the retaining pin from accidentally being withdrawn or falling out.

After one closing wheel assembly is removed from the gauge wheel assembly a different closing wheel assembly can be quickly mounted to the gauge wheel assembly by positioning the notches 24 of the side plates 22 onto the posts 26 of the gauge wheel frame, 14 with the tab 32 of the gauge wheel frame 14 extending through the slot 30 in the closing wheel coupler 18, then inserting the pin 38 through the aligned holes 34, 36, and securing the pin 38 with the pin 40.

Thus, the different sets of closing wheel assemblies can be quickly and easily interchanged simply by removing the pin 38 and disengaging the closing wheel assembly from the gauge wheel frame 14. This process saves significant time, compared to unbolting the closing wheels 20 from the frame 16 and substituting different closing wheels.

After the closing wheel assembly is attached to the gauge wheel frame, the closing wheels 20 can be centered for proper alignment behind the disks 17. The closing wheel frame 16 includes spaced apart arms 44 which extend along opposite sides of the coupler 18. The arms 44 each have a hole 46 therein, which aligns with a hole 48 in each of the side plates 22 of the coupler 18. One arm has a threaded nut 50 welded or otherwise fixed in or over the hole 46, while the other arm has a bushing 51 pressed or mounted in the hole 46.

On the right arm 44, a threaded adjustment bushing 52 extends into the nut 50. A pivot bolt 54 extends through the bushing 52 and is secured by a nut 56 on the inside of the right-side plate 22. The bushing 52 has opposite flattened surfaces 53 to receive the head of wrench or pliers, so as to turn the bushing for adjustment. A jam nut 58 is also provided on the bushing 52, to lock the bushing against rotation when the nut 58 is tightened. The bolt 54 has an axial channel 60 extending from the bolt head, with a grease zerk 62 mounted in the head. A grease outlet 64 allows grease to flow between the bolt 54 and the inside wall of the bushing 52.

On the left side, a pivot bolt 66 extends through the bushing 51 in the hole 46 and through the hole 48 and is secured by a nut 68 on the inside of the left plate 22 of the coupler 18. The bolt 66 is similar to the bolt 54, with an axial channel, a grease zerk 62, and a grease outlet 64 for greasing the inside of the bushing 51.

To center the closing wheels 20 relative to the disks 17, the jam nut 58 is loosened on the adjustable bushing 52, and the bushing is turned with a wrench into and out of the nut 50, such that the arms 44 can slide laterally left and right on the bolts 54, 66 so that the frame 16 is in a desired position. Then, the jam nut 58 can be tightened on the bushing 52 to prevent further lateral movement of the frame 16.

Thus, the bushing 52 and bolts 54, 66 provide an adjustment mechanism to allow quick and easy centering of the closing wheels 20. The bolts 54, 66 also allow the closing wheel frame 16 to pivot about the horizontal axis of the bolts as the row planter moves through the field. Thus, the bolts define an axle for pivotal movement of the closing wheel frame.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A closing wheel assembly for a row planter having a first frame mounted to a tool bar and a pair of posts extending laterally outwardly from the first frame, and the first frame supporting a pair of gauge wheels, the closing wheel assembly comprising:
    a second frame having opposite first and second lateral sides;
    a pair of closing wheels rotatably mounted on the second frame;
    a coupler on the second frame to mount the closing wheels to the row planter posts and having opposite forward and rearward ends;
    a pin extending through the coupler and the row planter to secure the second frame to the first frame;
    the coupler including spaced apart-forwardly open C-shaped notches with top and bottom edges in the forward end of the coupler to capture the posts;
    the second frame including arms positioned on opposite sides of the coupler and mounted to the coupler with a pair of bolts; and
    one of the bolts extending through a threaded bushing which is rotatable to adjust the lateral position of the closing wheels.

2. The closing wheel assembly of claim 1 wherein the coupler includes a slot adapted to receive a tab on the first frame.

3. The closing wheel assembly of claim 1 further comprising an adjustment mechanism including a threaded bushing on the second frame which moves the closing wheels laterally relative to the first frame when the bushing is rotated.

4. The closing wheel assembly of claim 1 wherein the bolts define a pivot axis for the second frame.

5. The closing wheel assembly of claim 1 wherein the second frame does not pivot about a vertical axis.

6. An adjustable closing wheel assembly for a row planter comprising:
    a frame having opposite first and second lateral sides and adapted to be coupled to the row planter;
    a pair of closing wheels rotatably mounted on the frame;
    a threaded bushing extending into the first lateral side of the frame;
    an unthreaded bushing extending into the second lateral side of the frame; and
    the threaded bushing being rotatable to adjust the frame relative to the row planter so as to simultaneously move the closing wheels for lateral positioning.

7. The adjustable closing wheel assembly of claim 6 further comprising a coupler to couple the frame to the row unit, and the bushings extending into opposite sides of the coupler.

8. A method of assembling furrow closing wheels onto a seed row planter unit comprising:

selecting a pair of closing wheels from a first set of closing wheels and a second set of closing wheels based on the type of seed to be planted and each set of closing wheels having a frame with forward and rearward ends; and mounting the selected pair of closing wheels onto the row planter by positioning forwardly open notches residing in vertical planes at the forward end of the frame on the selected set onto horizontal posts on the row planter unit.

9. The method of claim 8 further comprising centering the selected pair of closing wheels by turning a threaded bushing.

10. The method of claim 8 further comprising use of a pin removably extending through a first frame supporting the pair of closing wheels and through a second frame supporting a pair of furrowing disks.

11. The method of claim 8 wherein the notches are C-shaped.

12. A closing wheel assembly for a row planter having a gauge wheel assembly mounted to a first frame connected to a tool bar, comprising:

a second frame with a pair of closing wheels;

a coupler on the second frame and having opposite front and rear ends and opposite lateral sides with vertically oriented C-shaped forwardly open notches residing at the front end, and the coupler being adapted to receive posts on opposite sides of the gauge wheel assembly;

a pin removably extendable through the coupler and through the first frame to detachably mount the closing wheel assembly to the gauge wheel assembly; and the coupler is locked to the first frame solely by the pin.

13. The closing wheel assembly of claim 12 wherein the coupler includes a slot adapted to receive a tab on the first frame.

14. The closing wheel assembly of claim 12 further comprising a threaded bushing to connect the second frame to the coupler so as to adjust the closing wheels laterally when the bushing is rotated.

15. The closing wheel assembly of claim 12 wherein the notches having upper and lower edges, a closed back and an open front.

16. A closing wheel assembly for a row planter having a gauge wheel assembly mounted to a first frame connected to a tool bar, comprising:

a second frame with a pair of closing wheels;

a coupler on the second frame and having opposite front and rear ends and opposite lateral sides with vertically oriented C-shaped forwardly open notches residing at the front end, and the coupler being adapted to receive posts on opposite sides of the gauge wheel assembly;

a pin removably extendable through the coupler and through the first frame to detachably mount the closing wheel assembly to the gauge wheel assembly; and a threaded bushing to connect the second frame to the coupler so as to adjust the closing wheels laterally when the bushing is rotated.

17. The closing wheel assembly of claim 16 wherein the coupler includes a slot adapted to receive a tab on the first frame.

18. The closing wheel assembly of claim 16 wherein the notches having upper and lower edges, a closed back and an open front.

\* \* \* \* \*